(12) United States Patent
Fernandez Galan

(10) Patent No.: US 11,816,720 B1
(45) Date of Patent: Nov. 14, 2023

(54) CONTENT RANKING USING RANK PRODUCTS

(71) Applicant: Amazon Technologies, Inc., Seattle, WA (US)

(72) Inventor: Roberto Fernandez Galan, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 392 days.

(21) Appl. No.: 17/034,580

(22) Filed: Sep. 28, 2020

(51) Int. Cl.
*G06Q 30/00* (2023.01)
*G06Q 30/0601* (2023.01)
*G06F 16/9538* (2019.01)
*G06N 20/00* (2019.01)

(52) U.S. Cl.
CPC ..... *G06Q 30/0629* (2013.01); *G06F 16/9538* (2019.01); *G06N 20/00* (2019.01)

(58) Field of Classification Search
CPC .................................................. G06Q 30/0629
See application file for complete search history.

(56) References Cited

U.S. PATENT DOCUMENTS

| | | | | |
|---|---|---|---|---|
| 10,025,832 B2 * | 7/2018 | Iwasa | ................... | G06F 16/951 |
| 10,055,463 B1 * | 8/2018 | Chandrasekaran | ......................... | G06F 16/24578 |
| 10,984,007 B2 * | 4/2021 | Yao | ................... | G06F 16/9038 |
| 2015/0347974 A1 * | 12/2015 | Sinha | ................... | G06Q 50/01 |
| | | | | 705/319 |
| 2016/0188606 A1 * | 6/2016 | Bandyopadhyay | ... | G06F 16/951 |
| | | | | 707/706 |
| 2017/0270586 A1 * | 9/2017 | Dumon | ............. | G06Q 30/0603 |
| 2020/0065421 A1 * | 2/2020 | Wang | ................... | G06N 20/00 |
| 2021/0035180 A1 * | 2/2021 | Chakraborty | ..... | G06F 16/24578 |
| 2021/0118034 A1 * | 4/2021 | Indrakanti | ............. | G06F 16/248 |
| 2022/0237714 A1 * | 7/2022 | Mukherjee | ......... | G06Q 30/0629 |

OTHER PUBLICATIONS

Dalal, Onkar, Srinivasan H. Sengemedu, and Subhajit Sanyal. "Multi-objective ranking of comments on web." Proceedings of the 21st international conference on World Wide Web. 2012.*

* cited by examiner

*Primary Examiner* — Kathleen Palavecino
(74) *Attorney, Agent, or Firm* — K&L Gates LLP

(57) ABSTRACT

Devices and techniques are generally described for ranking of search results. In some examples, a query may be received. A first ranked list of content items may be determined for the query ranked based on a first optimization objective. A second ranked list of the content items may be determined for the query ranked based on a second optimization objective. A first rank product may be determined for a first content item based at least in part on multiplication of a rank of the first content item in the first ranked list with a rank of the first content item in the second ranked list. A third ranked list of the content items may be determined based at least in part on the first rank product. At least a portion of the third ranked list of the content items may be displayed on a display.

20 Claims, 7 Drawing Sheets

| TREATMENT | ONLINE SESSIONS | TOTAL REVENUE | | | TOTAL SALES | | |
| --- | --- | --- | --- | --- | --- | --- | --- |
| | | REVENUE | RELATIVE CHANGE | P-VALUE | SALES | RELATIVE CHANGE | P-VALUE |
| Baseline | 3,208,901 | $101,814,814 | -- | -- | 1,224,192 | -- | -- |
| T1 | 3,210,805 | $101,730,114 | -0.07% (-0.46%, 0.31%) | 0.713 | 1,226,848 | 0.17% (-0.01%, 0.35%) | 0.069 |
| T2 | 3,214,135 | $101,923,002 | 0.03% (-0.36%, 0.41%) | 0.897 | 1,229,189 | 0.27% (0.09%, 0.45%) | 0.004 |
| T3 | 3,212,978 | $101,929,728 | 0.01% (-0.38%, 0.40%) | 0.963 | 1,226,959 | 0.13% (-0.05%, 0.31%) | 0.170 |

FIG. 3B

CONTENT RANKING USING RANK PRODUCTS

BACKGROUND

Machine learning models are often used to rank and order search results returned from search queries. Different objectives are often considered when determining how to rank search results. For example, historical behavior, business objectives, textual similarity to the search query, and latency of responses, among other objectives, can be used to determine how to rank search results for a particular search query. Parameters of machine learning models and/or features used for prediction are often manually tuned and/or selected in order to meet performance goals.

BRIEF DESCRIPTION OF DRAWINGS

FIG. 3B depicts example experimental results comparing performance of various implementations of the rank product techniques described herein with another ranking approach, in accordance with various aspects of the present disclosure.

DETAILED DESCRIPTION

Figure 1:
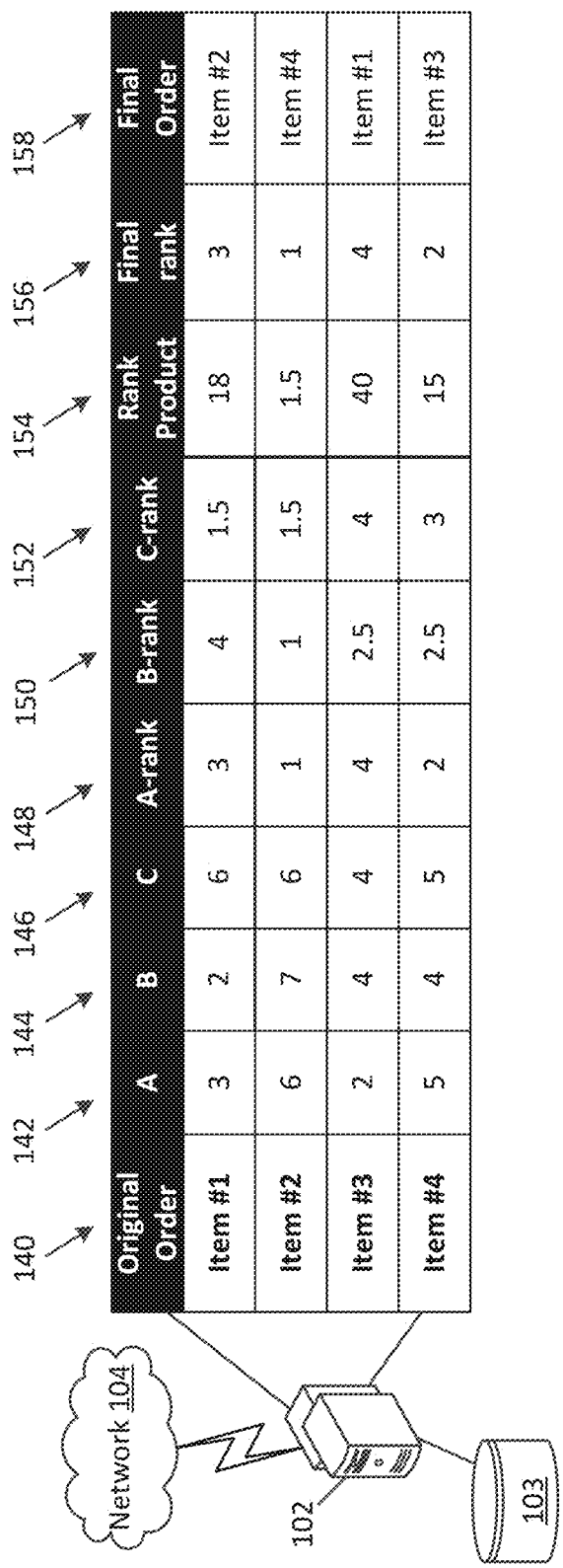
FIG. 1 is a block diagram illustrating an example of content item ranking using rank products, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Content search (e.g., such as searches provided by e-commerce sites) is an important service allowing users to search for content items which they can purchase, or upon which they can take some action, such as adding to their shopping cart, caching for future investigation, or exploring their attributes. Recently, content search (sometimes referred to as product search) has also been supported by intelligent voice assistants that enable the user to use a voice interface to search for products over online catalogs. Given a user query, the quality of the search results may be a leading factor in affecting user satisfaction in the e-commerce service. When quality signals are associated with training instances, either implicitly (e.g., through user behavioral data) or explicitly (e.g., through manual annotations) a Learning-to-Rank (LTR) approach may be used to train a ranking model to rank search results. The model ranks the products with respect to the query, with the goal of achieving maximum agreement with the rank induced by the given quality signals (e.g., training instance labels), where agreement is typically measured by standard relevance metrics such as those generated by the normalized discounted cumulative gain (NDCG) and mean reciprocal rank (MRR) algorithms. When more than one signal (e.g., more than one optimization objective) is given, an essential question arises, as to how should the signals be combined in order to optimize for search quality. Typical objectives that may be considered in product search may include semantic relevance of the results to the query, user engagement, search defects, product quality, product freshness, purchase likelihood, product quality, user rating, return rate, shipping time, etc.

LTR approaches to ranking search results for product and/or content searches is a popular and consolidated approach to the problem of content ranking in response to input queries. Generally, LTR algorithms sort content items according to a nonlinear function of features to promote relevant items. The definition of relevance is configurable and can be defined in order to optimize for a particular ranking objective. For example, in a product search context, features may be selected that maximize revenue from content item purchases. In LTR, the function of features is typically computed as an ensemble of decision trees. In an e-commerce context, content items may be ranked in response to a customer's query. The content items may be goods and/or services, and/or digital products (e.g., streaming movies, music, software, games, etc.). Content items are associated with attributes that represent different facets of the content items. For example, keywords, content images, user interaction data associated with a content item (such as an item's click-through rate by users), recent purchases of the item, how well the item matches the input query, etc.. In some current ranking technologies, the number of features used to compute a ranking may be limited in practice to a certain number based on compute budget. For example, the number of features may be fewer than 20, or some other number. Using an excess number of features during ranking computation may significantly increase both compute cost and the time elapsed between submitting a query and displaying the results (latency). Exceeding compute budgets may cause unnecessary expense, while increased latency may lead to unsatisfactory user experiences. In various examples described herein, rank product techniques are described that can improve ranking efficiency and/or accuracy in a variety of applications while maintaining or improving latency of search results.

Accordingly, described herein is a rank product algorithm that may be used in the context of search relevance. However, the rank product algorithm also has other potential uses. For example, the rank product algorithm may be used in the context of voting to determine a candidate that is most popular among multiple different optimization objectives. The rank product techniques described herein may be generally applicable for optimally ranking a set of N content items, with each item having M features—provided that the features are ordinal and that, without loss of generality, higher values are better than lower values for the features. In other words, a higher feature value results in a higher ranking of an item, if ranked based on that feature alone. As described in further detail below, for each content item, the rank product may be the product of the ranks of the M features when sorted individually across the N items. However, in various examples, the ranks of individual items may be combined in other ways (apart from multiplication). For example, the individual ranks may be added to generate a combined multi-objective ranking. Rank product values (e.g., multi-objective rankings) may then be used to sort the items according to the rank product (with content items having lower rank product values being ranked higher in the final ranking relative to content items having higher rank product values). In the description below, three different potential applications of the rank product techniques described herein are proposed for search relevance: 1) ranking items with a minimal set of features, 2) aggregating partially redundant features to improve efficiency of machine-learning rankers, and 3) combining rankers that optimize for different targets into a single multi-objective ranker. As used herein, a rank product refers to a multi-objective ranking that is a combination of different individual rankers (with each individual ranker being optimized for a different ranking objective).

As previously described, LTR algorithms use machine learning to learn and predict a target (e.g., revenue per query) from a combination of inputs (features). In various examples, certain features may be better for predicting relevance (for a particular objective) than other features. Not surprisingly, these features contribute strongly to the information gain in the decision trees that make up the score function of search relevance models. However, the rank product techniques described herein may be used with simpler, more suitable functions of features that may be used to maximize relevance (e.g., product purchases) without any training/learning. Using a minimal set of features without the need to train/retrain machine learning models may be beneficial in terms of conserving compute resources (as additional features need not be computed, stored, and/or retrieved) without loss of relevance. The minimal set of features may be a subset of the features used for ranking by a baseline-ranking model (e.g., a single objective LTR model).

In various examples described herein, the rank product techniques may also assist machine-learned algorithms in improving efficiency. For example, various rank product techniques discussed herein may be used to create composite features (e.g., aggregated features) from partially redundant features used in standard LTR algorithms, where the composites replace the features they are computed from. This would allow for a reduction of several features (~5) down to a single composite feature, making standard algorithms faster to run and reducing storage/retrieval operations. Moreover, the various rank product techniques discussed herein may be used as a target for pair-wise or list-wise ranking models. In these applications, the rank product of a composite feature could be precomputed and indexed alongside its constitutive features.

LTR algorithms typically use a single relevance target (e.g., optimization objective), such as revenue per query. However, it may be beneficial to consider other factors to provide improved experiences in online search and result ranking. For instance, users of e-commerce services are typically interested in, and more likely to purchase, items than can be delivered more quickly. Some users are also more likely to buy items from trusted brands. Search relevance, in practice, is a multi-objective problem. However, LTR algorithms were conceived for single-objective optimization, making their use in a multi-objective context an ill-fitting approach. To tackle this problem, the various rank product techniques described herein can be used to combine the outputs of several rankers (e.g., LTR rankers), each optimized for a different target. By contrast, typical multi-objective optimization approaches for LTR algorithms attempt to combine inputs (features) in order to achieve optimize relevance for multiple objectives. The various rank product techniques described herein can optimize all targets at the same time to rank those content items that are most relevant across multiple objectives at the top of the search results.

Although the techniques described herein are principally discussed in reference to ranking of products in response to a product search, searching and ranking of search results is a broad discipline that encompasses many different applications. For example, web searches, searching of research databases, website searches, etc. are example applications of search result ranking. The various techniques described herein are applicable generally to any search function. However, for ease of illustration, the techniques are described herein with respect to e-commerce product searches. However, it should be appreciated that the computer-implemented techniques described herein are equally applicable to ranking of search results in any search context that includes multiple ranking objectives.

Single Objective Ranking Optimization

Training for a machine learning ranking algorithm in a single objective ranking optimization context is typically initiated with a set of n product related queries $Q=\{q_1, \ldots, q_n\}$; each $q \in Q$ is associated with a set of products $\mathbb{P}q=\{p_1, \ldots, p_{kq}\}$. Each product $p_i \in \mathbb{P}_q$ is represented as a query dependent feature vector, with a corresponding relevance label $\ell(q,p_i) \in [0, 1]$ that indicates the relevance of $p_i$ to query q. The 0 label represents a product that is irrelevant to query q, while 1 represents the highest relevance grade. Let $\mathbb{L}q=\{\ell(q, p_1), \ldots, \ell(q, p_{kq})\}$ be the labels of all products in $\mathbb{P}_q$. A training instance of the LTR task comprises the tuple $I=(q, \mathbb{P}_q, \mathbb{L}_q)$.

Let $\mathcal{A}$ denote a single-objective LTR algorithm with a fixed set of hyper parameters (e.g., number of trees in a gradient boosting tree (GBT) algorithm, tree depth, etc.). Given a sample of training instances $\mathcal{J}=\{I_1, \ldots, I_m\}$, the goal of $\mathcal{A}$ is to create a ranking model, $M(q, p)=\mathcal{A}(\mathcal{J})$, that scores a product p with respect to q, such that the ranking induced by the M scores over $\mathbb{P}_q$ has maximal agreement with $\mathbb{L}_q$. The loss function Loss $\ell$ (I, M) gets as input a training instance I, together with the ranking model M, and estimates the disagreement between the orders induced by M and by $\mathbb{L}_q$ over $\mathbb{P}_q$. The cost function that $\mathcal{A}$ tries to minimize is Cost $\ell(\mathcal{J}, M)=E_{I \in \mathcal{J}}$ [Loss $\ell$ (I, M)]. When $\mathcal{J}$ is clear from the context we will denote the cost by Cost $\ell$ (M). Generally, parameters of machine learning models may be updated in a supervised learning setting by minimizing a difference between a prediction of the machine learning model and a ground truth label of a training instance.

LambdaMart is an example LTR algorithm that is based on a pairwise cross-entropy loss function. The LambdaMart algorithm minimizes the cost function by iterative updates of the ranking model, an ensemble of gradient boosted decision trees, based on the approximation of the gradient of Cost $\ell$ (M).

FIG. 1 is a block diagram illustrating an example of content item ranking using rank products, according to various embodiments of the present disclosure. In various examples, one or more computing devices 102 may receive a search query to search for products available via an e-commerce service (e.g., through one or more servers of an e-commerce service). As previously described, although ranking of product search queries are described in many of the following examples, the ranking techniques described herein are equally applicable to any computer-implemented search systems. In various examples, network 104 is a wide area network, such as the Internet, while in other embodiments, the network 104 is a local area network (LAN) over which search queries are sent and search results are returned. In some further embodiments network 104 is a combination of the Internet and a LAN.

The one or more computing devices 102 may be effective to implement the various rank product techniques described herein to determine a ranked list of content items. In various examples, memory 103 may be a non-transitory computer-readable memory that may store instructions that, when executed by at least one processor of the computing devices 102, are effective to perform the various rank product techniques described herein.

The various rank product techniques described herein may be applicable to sort N items with each of the N items having M features, assuming that all features are ordinal and that, without loss of generality, higher feature values indicate increased relevance (e.g., to the search query) relative to lower feature values.

FIG. 1 depicts an example with four content items (e.g., Item #1, Item #2, Item #3, and Item #4). The items are presented in an original order 140, wherein Item #1 is initially in the top-ranked position and Item #4 is initially in the lowest-ranked position. In the example, each of the content items is associated with three ordinal features: A (column 142), B (column 144), and C (column 146). The feature values for each of the features A, B, and C are shown in the respective columns 142, 144, and 146 for each of the items #1, 2, 3, and 4. Additionally, each of the items #1, 2, 3, and 4 are ranked for each of the features individually—treating each feature as a single objective for ranking the items. In various examples, instead of columns 142, 144, and 146 representing feature values for features A, B, and C, respectively, columns 142, 144, and 146 may instead represent the output of single objective machine learning models trained to determine a ranking of items #1, 2, 3, and 4 for objectives A, B, and C.

In any case, column 148 displays a rank of the items #1, 2, 3, and 4 when ranked according to the values of column 142 (e.g., features/machine learning outputs for feature A). The A-rank list in column 148 may rank each content item in descending order of the respective feature values. In other words, content items with the higher feature values for feature A are ranked higher relative to content items with lower feature values for feature A. In the example depicted in FIG. 1, Item #2 is the top-ranked content item (rank 1) when ranked for feature A, as Item #2 has the highest feature value for feature A—six. Item #3 is the lowest-ranked item (rank 4) when ranked for feature A, as Item #3 has the lowest feature value for feature A—two.

Similarly, column 150 displays a rank of the items #1, 2, 3, and 4 when ranked according to the values of column 144 (e.g., features/machine learning outputs for feature B). In the example depicted in FIG. 1, Item #2 is the top-ranked item (rank 1) when ranked for feature B, as Item #2 has the highest feature value for feature B—seven. Item #1 is the lowest-ranked item (rank 4) when ranked for feature B, as Item #3 has the lowest feature value for feature B—two.

Similarly, column 152 displays a rank of the items #1, 2, 3, and 4 when ranked according to the values of column 146 (e.g., features/machine learning outputs for feature C). In the example depicted in FIG. 1, Items #1 and 2 are tied for the top-ranked item (denoted as rank 1.5, due to the tie) when ranked for feature C, as both Item #1 and Item #2 are tied for the highest feature value for feature C—six. Item #3 is the lowest-ranked item (rank 4) when ranked for feature C, as Item #3 has the lowest feature value for feature C—four.

Column 154 represents the rank product for each of the items. The rank product is the product of the ranks displayed in each of columns 148, 150, and 152. Accordingly, for Item #1, the rank product is the A-rank of 3, multiplied by the B-rank of 4, multiplied by the C-rank of 1.5 for a rank product of 18. For Item #2, the rank product=1*1*1.5=1.5. For Item #3, the rank product=4*2.5*4=40. For Item #4, the rank product=2*2.5*3=15.

Column 156 displays the final rank of Items #1, 2, 3, and 4, ranked based on comparison of the rank products from column 154. Items with a lower rank product are ranked higher in the rankings relative to items with a higher rank product. Ranking higher in the rankings indicates that the Items are displayed earlier in search results. Item #2 has the lowest rank product at 1.5 and accordingly has the final rank 1—indicating that Item #2 is the top-ranked item in the Final Rank column 156. Column 158 displays the final order of the items (e.g., an order in which the items may be displayed as search results). The items are ordered in ascending order of the rank products. Accordingly, Item #2 (with the lowest rank product) is the first-ranked item, Item #3 (with the second lowest rank product) is the second-ranked item, Item #4 (with the second highest rank product) is the third-ranked item, and Item #3 (with the highest rank product) is the fourth-ranked item.

In the case of search relevance at an e-commerce site, the items may be items for sale on the e-commerce service, which may be relevant to a received query. The features A, B, and C may be numeric representations of the attributes of the items. For example, the features may be data indicating recent purchases of the items, click-through rate related to the items, brand scores, a score indicating delivery speed, a score indicating how well the item matches the received user query, etc. Alternatively, as previously described, A, B and C could represent the outputs of three machine learning rankers optimized for different single targets. Accordingly, the rank product methodology described above optimizes all three targets simultaneously. Regardless of the context, note that the items that rank higher with the rank product techniques described above are those for which the values of A, B, and C are consistently higher than for other items.

Figure 2:
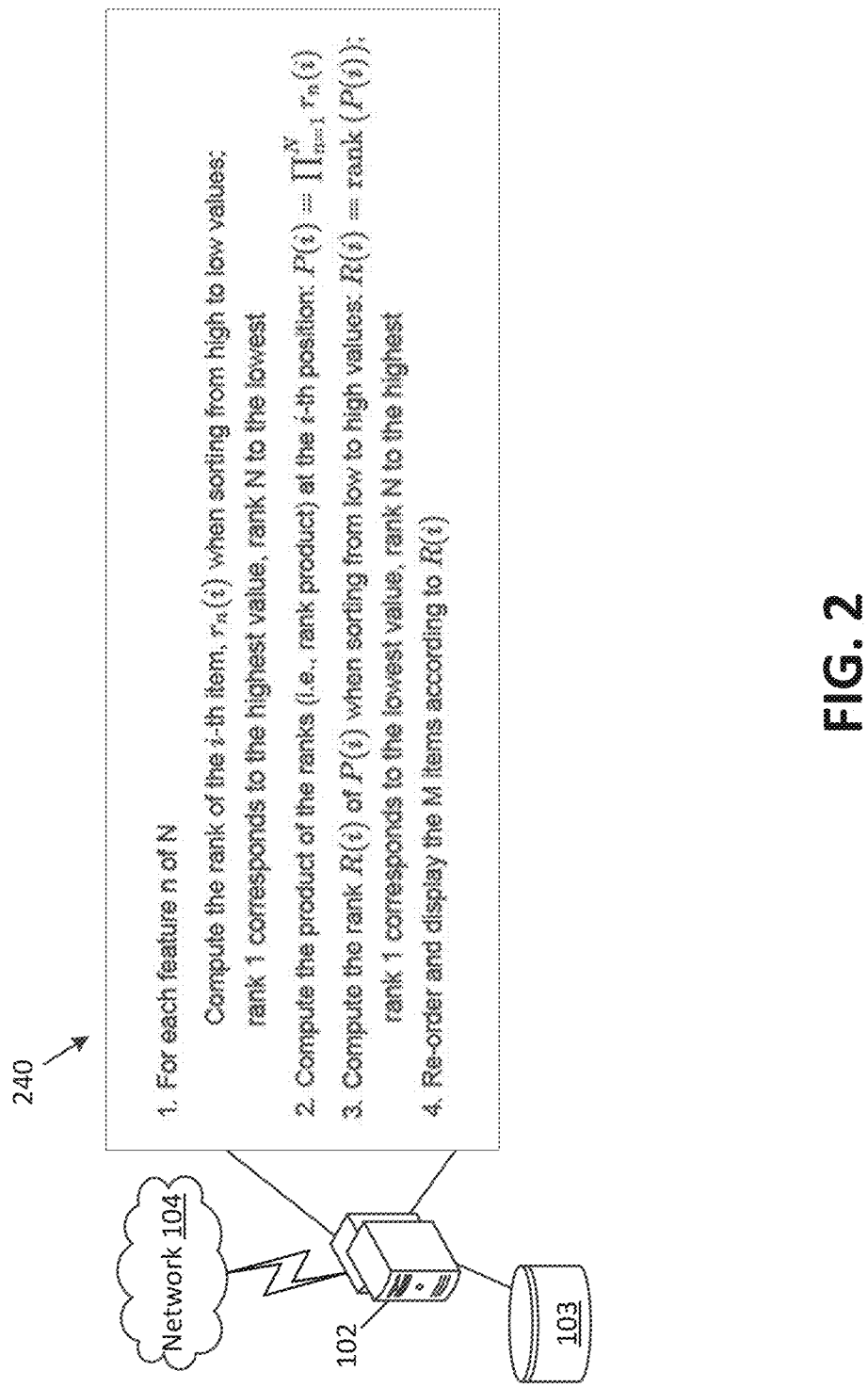
FIG. 2 is a block diagram illustrating example pseudocode that can be used to implement the rank product algorithm, in accordance with various embodiments of the present disclosure.

FIG. 2 is a block diagram illustrating example pseudo-code 240 that can be used to implement the rank product algorithm, in accordance with various embodiments of the present disclosure. In various examples, the rank product techniques described herein may assume that features are ordinal—indicating that the feature values are expressed in ordinal numbers that can be ordered (e.g., according to the value of the numbers). In some further examples, the rank product techniques described herein may assume that higher feature values are associated with higher ranks (e.g., increased relevance) for the item. For example, if content items are ranked using a single optimization objective based only upon feature A, the item with the highest feature value for feature A may be ranked the highest (e.g., the item may be the top-ranked item).

In the example depicted in FIG. 2, at step 1, for each feature n of a set of features N, the rank of the i-th item, $r_n(i)$, may be computed, when sorting from high to low values. Rank 1 corresponds to the highest value, while rank N corresponds to the lowest value. Accordingly, a rank of the items is determined for each feature n. At step 2, the product of the ranks (e.g., the rank product) may be determined at the i-th position: $P(i)=\Pi_{n=1}^{N} r_n(i)$.

At step 3, the rank R(i) of P(i) may be determined when sorting from low to high values: R(i)=rank(P(i)). Here, rank 1 corresponds to the lowest rank product value, while rank N corresponds to the highest rank product value. At step 4 the items may be re-ordered according to the rank R(i) and may be displayed (e.g., to a user in response to the user's query).

Figure 3A:
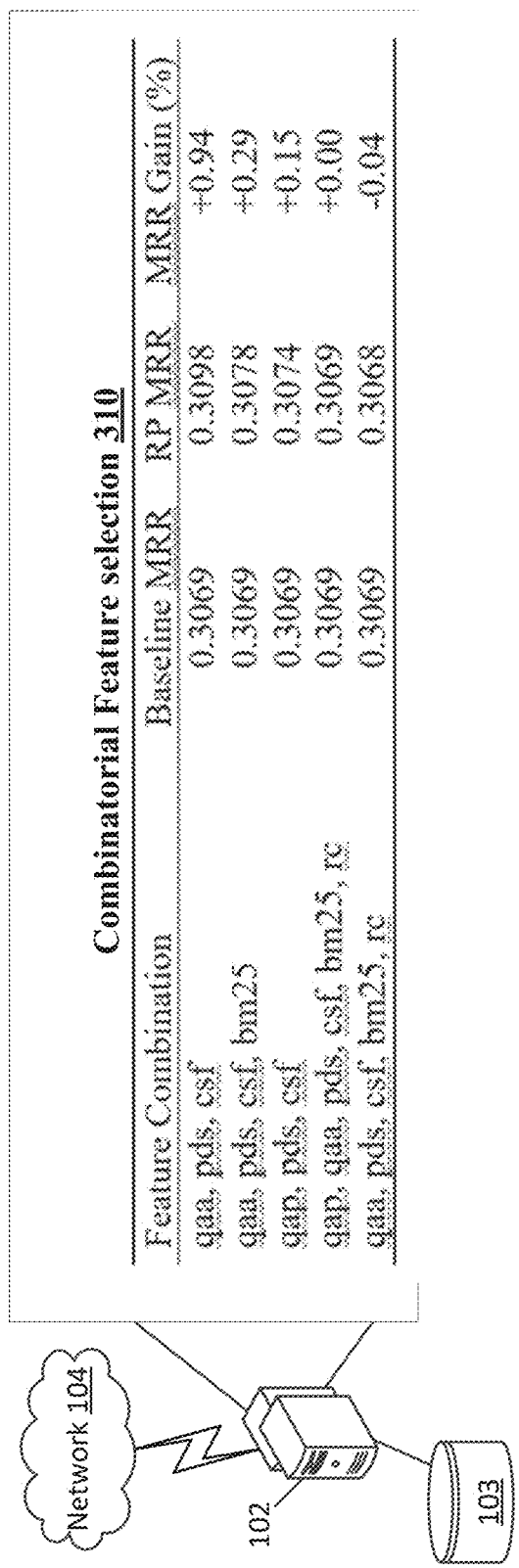
FIG. 3A depicts a block diagram illustrating evaluation of combinatorial features that may be used with the various rank product techniques described herein, in accordance with various embodiments of the present disclosure.

FIG. 3A depicts a block diagram illustrating evaluation of combinatorial features that may be used with the various rank product techniques described herein, in accordance with various embodiments of the present disclosure. In the example of FIG. 3A, MRR may be used to perform combinatorial feature selection 310.

In some applications, at scale, feature selection may be a critical step to successful application of the various rank product techniques described herein to search relevance. Accordingly, in some examples, a goal may be to determine combinations of features for which the rank product techniques described herein promotes an optimization objective (e.g., promotion of purchases among items displayed in search results in the e-commerce example). In order to perform combinatorial feature selection 310, search result data that led to purchases of some of the returned content items may be collected. In various examples, such data may comprise a large sample of actual queries submitted by users paired with the corresponding search results (query groups), including the order in which content items are presented to users, indications of which items were purchased, and the corresponding features of all displayed search results (e.g., the ordered list of content items).

In various examples, the mean reciprocal rank (MRR) or other relevance metric (e.g., NDCG, average precision, and/or modified relevance metrics such as MRR weighted based on purchase amount) may be computed. The MRR is computed as the inverse of the purchased/selected item position in the ranked search results, averaged across all purchases/selections in the database:

$$MRR = \frac{1}{\text{number of purchases}} \sum_{\text{purchases}} \frac{1}{\text{purchase position}}$$

The larger the MRR, the higher the content item appeared that the user purchased/selected. Each query group may be re-ranked using the rank product techniques described above in reference to FIGS. 1 and 2 and the MRR may be computed and compared against the MRR of the baseline ranker (e.g., the default ranking system (such as an LTR algorithm)).

In various examples, a minimalist set of features for which the rank product techniques described herein optimizes MRR may be empirically determined using the above approach. For example, an initial set of features that are associated with the optimization objective may be selected to start. In the example below, an initial set of eight features that are associated with purchases either by the feature definition, or are known to contribute with high information gain to baseline rankers that optimize for revenue-per-query. The list of features may be used to compute content rankings using an LTR algorithm (e.g., a baseline ranker). In the current example, these features may be:

1. query_item_poep (qap): position-normalized purchase rate for the content item in that query.
2. query_item_aoea (qaa): position-normalized "add to cart" rate for that content item in that query.
3. query_item_coec (qac): position-normalized click rate for that content item in that query.
4. phrasedoc_score (pds): measures how well a content item matches the user's raw query keywords, as estimated from user behavior.
5. user_share_factor (csf): scales logarithmically with number of users who purchased this content item/total number of users, decayed by 2-weeks half-life.
6. bm25_v2 (bm25): BM25 feature measuring the similarity between a content item's catalog description and the user's query.
7. review_count (rc): number of reviews for that content item. Note that content items with more purchases have more reviews, regardless of the quality/performance of the content item.
8. brand_score (bs): measures users' perception of the content item's brand quality.

Next, in the current example, all combinations of M=8 features taken in groups of m may be calculated, for m=1 to m=M. The total number of feature combinations is:

$$\sum_{m=1}^{M} \binom{M}{m} = \binom{M}{1} + \binom{M}{2} + \ldots + \binom{M}{M-1} + \binom{M}{M} =$$

$$\sum_{m=1}^{M} \frac{M!}{m!(M-m)!} = 2^M - 1 = 255$$

The combinatorial feature selection 310 in FIG. 3A displays the top five feature combinations in terms of MRR. The right-most column (MRR Gain (%) shows the MRR gain relative to a particular baseline ranker model. Rows in the table are sorted according to the MRR gain. The feature combination with highest MRR comprises only three features: qaa, pds, and csf. This combination increases the MRR of the baseline ranker by almost 1%. A similar combination with the addition of the BM25 feature also improves the MRR of the baseline ranker by 0.29%. In total, there are four combinations of six or fewer features that match or improve the MRR of the baseline ranker. Any of these combinations could be aggregated into a single feature to reduce the number of inputs to standard machine-learned rankers. In order to aggregate features, the feature values of the features to be aggregated may be multiplied together. Advantageously, combining multiple features into a single feature (without loss of ranking relevance) reduces the number of features that are retrieved at runtime during ranking. Accordingly, this technique lowers compute overhead and may reduce latency.

FIG. 3B depicts example experimental results comparing performance of various implementations of the rank product techniques described herein with another ranking approach, in accordance with various aspects of the present disclosure. In the example of FIG. 3B, total revenue and total sales for an e-commerce service are tested when ranking items using a baseline ranker (e.g., a machine learned ranker) vs. three different implementations (e.g., T1, T2, and T3) of the rank product techniques described herein. In the example depicted in FIG. 3B, the baseline ranker uses 18 features during ranking.

By contrast, rank product implementation T1 represents a ranking determined by combining the ranking order of three different rankers, each of which ranks using only a single feature (qaa, pds, or csf). Content is ranked separately for each feature and the three rankings are combined using the rank product techniques described herein. Similarly, rank product implementation T2 uses four features (aqq, pds, csf, bm25). Content is ranked separately for each of the four features and the four rankings are combined using the rank product techniques described herein. Note that multiple features could optionally be used for each of the single-objective rankings. However, in the example depicted in FIG. 3B, only a single feature is used for each single-objective ranker. The rankings of the single-objective rankers are combined using the rank product techniques discussed herein. The relative impact is displayed as an average across sessions with confidence intervals in parentheses. Note that implementation T2 significantly increases the number of sales and trends positively in terms of revenue as well, relative to the baseline ranker. The other treatments, which combine the rankings from different single-objective rankers that each rank items based on item attribute values (e.g., features), are statistically indistinguishable from the baseline. Despite using many fewer features relative to the baseline ranker, treatments T1, T2, and T3 offer equivalent or better performance relative to the baseline ranker and each incorporate multiple ranking objectives into the final ranking. Accordingly, the rank product techniques described herein may offer significant benefits over machine learned models in terms of performance, as well as in terms of reduced computational expense and latency. There can be hundreds of attributes associated with a typical item listing of an e-commerce service. Accordingly, the ability to distill the number of attributes used by a multi-objective ranker down to a few (e.g., three or four), without loss of performance, may offer immense advantages in terms of computational efficiency, compute overhead, and/or processing speed.

Figure 4:
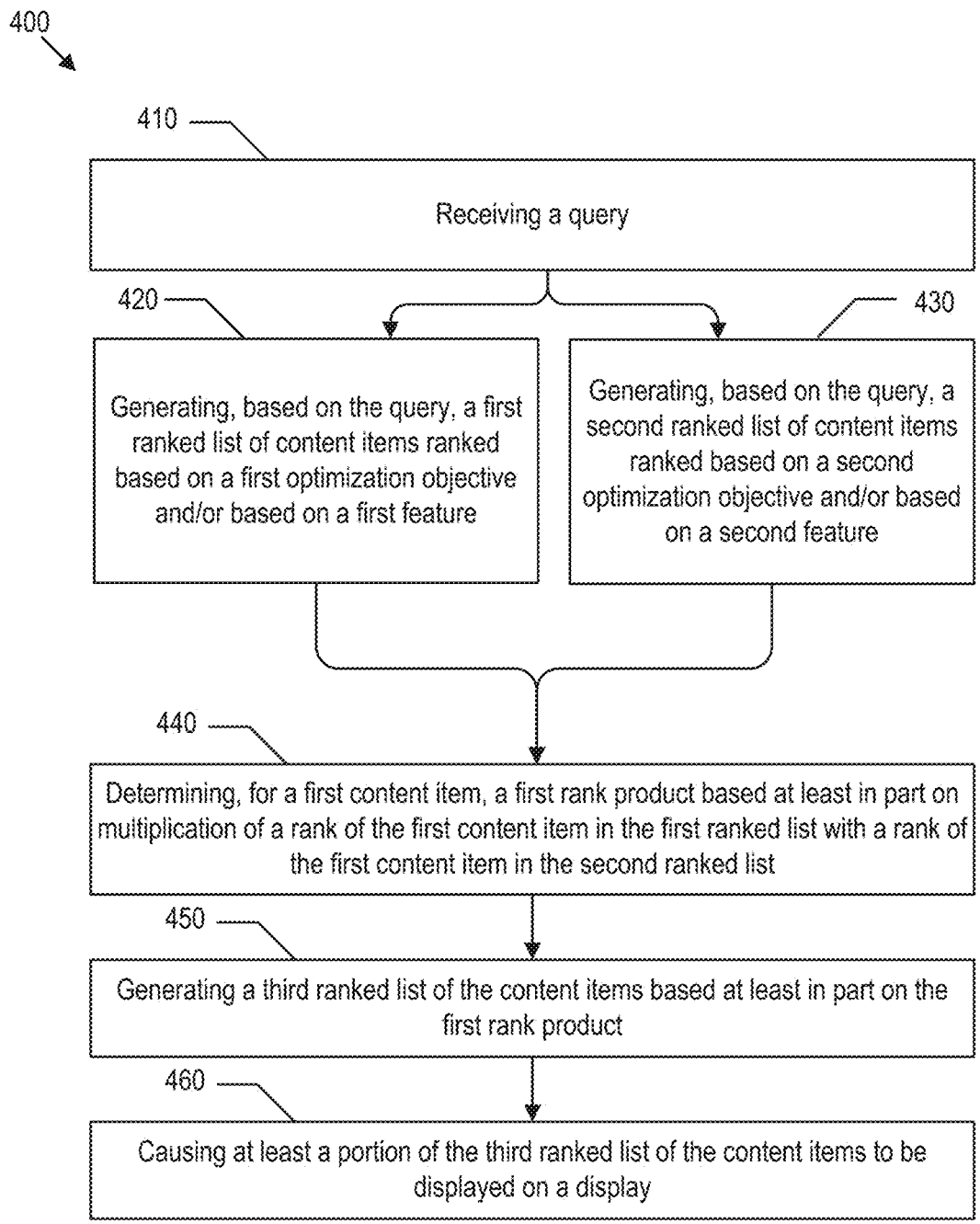
FIG. 4 is a flow chart illustrating an example process for content ranking using rank products, in accordance with various embodiments of the present disclosure.

FIG. 4 is a flow chart illustrating an example process 400 for content ranking using rank products, in accordance with various embodiments of the present disclosure. Those actions in FIG. 4 that have been previously described in reference to FIGS. 1-3 may not be described again herein for purposes of clarity and brevity. The actions of the process depicted in the flow diagram of FIG. 4 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure. In addition, various steps may be performed in parallel (and/or in series) depending on the desired implementation.

Process 400 of FIG. 4 may begin at action 410, at which a query may be received. In various examples, the query may be a user-submitted search query. For example, the query may be a search query for an item for sale on an e-commerce site. For example, the query may be a user search for "purple coffee mug." In some other examples, the query may be a search engine search for a particular document or web page. For example, the query may be a search of an online archive for "medieval castles."

Processing may continue to action 420, at which a first ranked list of content items may be generated based on the query. The first ranked list of content items may be ranked based on a first optimization objective and/or based on a first feature. For example, the first ranked list of content items may be ranked based on a single optimization objective—such as based on a single feature value (and/or an aggregated feature value). In various examples, items with the highest feature value for the particular feature (e.g., for the feature associated with the optimization objective) may be ranked the highest (e.g., may appear first in the ranked list). In various examples, the first ranked list of content items may be generated based on the output of an individual ranking algorithm (e.g., an LTR ranker optimized based on a single objective).

Processing may continue to action 430, at which a second ranked list of content items may be generated based on the query. The second ranked list of content items may be ranked based on a second optimization objective and/or based on a second feature. For example, the second ranked list of content items may be ranked based on a different single optimization objective—such as based on a different feature value (and/or an aggregated feature value). In various examples, items with the highest feature value for the particular feature (e.g., for the feature associated with the optimization objective) may be ranked the highest (e.g., may appear first in the ranked list). In various examples, the second ranked list of content items may be generated based on the output of an individual ranking algorithm (e.g., an LTR ranker optimized based on a single objective). In various examples, actions 420 and 430 may be performed in parallel in order to minimize latency.

Processing may continue to action 440, at which a first rank product may be determined for a first content item based at least in part on a multiplication of a rank of the first content item in the first ranked list and a rank of the first content item in the second ranked list. In other words, the first content item's rank from the first ranked list (ranked based on a first feature/first optimization objective) may be multiplied by the first content item's rank from a second ranked list (ranked based on a second feature/second optimization objective). In some examples, the first rank product may be a product of all of the ranks for the first item among multiple different features/rankings. In some other examples, the first rank product may be a product of a selected set of ranks for the first item among multiple different features/rankings.

Processing may continue to action 450, at which a third ranked list of the content items may be generated based at least in part on the first rank product. For example, the content items may be ranked in ascending order of rank products, as described above in reference to FIGS. 1-2. In such an example, the content item having the lowest rank product may be the top-ranked result (e.g., the highest ranked result). Processing may continue to action 460, at which code and/or executable instructions may be generated to cause at least a portion of the third ranked list of the content items to be displayed on a display. For example, computing device(s) 102 (FIG. 1) may cause at least a portion of the third ranked list—ranked using the rank product techniques described herein—to be displayed to the user in response to the user's query (e.g., the query received at action 410).

Figure 5:
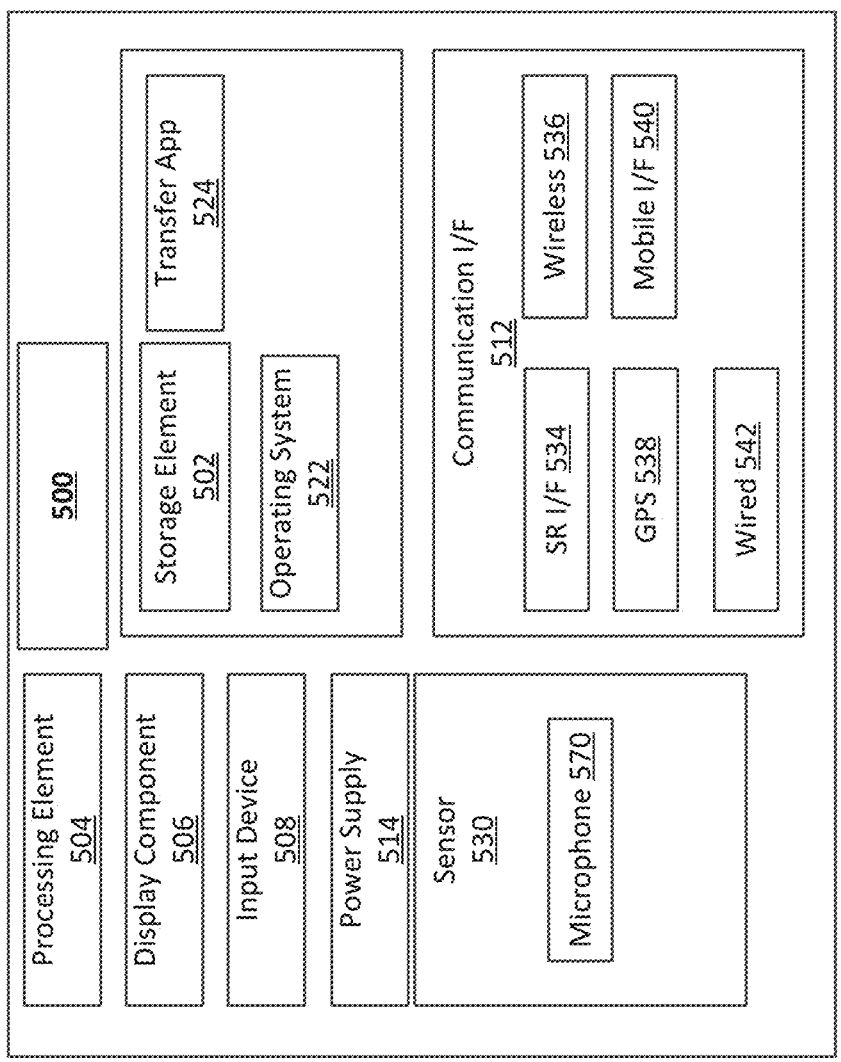
FIG. 5 is a block diagram showing an example architecture of a computing device that may be used in accordance with various embodiments described herein.

FIG. 5 is a block diagram showing an example architecture 500 of a computing device used to implement the various rank product techniques described herein, in accordance with various aspects of the present disclosure. It will be appreciated that not all devices will include all of the components of the architecture 500 and some user devices may include additional components not shown in the architecture 500. In an example embodiment, the architecture 500 includes one or more processing elements 504 for executing instructions and retrieving data stored in a storage element 502. The processing element 504 comprises at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. In an example embodiment, the storage element 502 comprises flash memory, random-access memory, disk-based storage, etc. Different portions of the storage element 502, for example, are used for program instructions for execution by the processing element 504, storage of images or other digital works, and/or a removable storage for transferring data to other devices, etc. Additionally, storage element 502 may store various costs, iterative penalty values α, and/or other values determined using the above-described techniques when updating the models and/or storing feature values.

The storage element 502 may also store software for execution by the processing element 504. An operating system 522 may provide the user with an interface for operating the computing device and may facilitate communications and commands between applications executing on the architecture 500 and various hardware thereof. In an example embodiment, a transfer application 524 is configured to receive images, audio, and/or video from another device (e.g., a mobile device, image capture device, and/or display device) and/or from microphone 570 included in the architecture 500.

When implemented in some user devices, the architecture 500 comprises a display component 506. The display component 506 can comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or segmentation masks generated in accordance with the various techniques described herein.

The architecture 500 may also include one or more input devices 508 operable to receive inputs from a user. Example input devices 508 include a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

In an embodiment, the communication interface 512 comprises one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. In an embodiment, a short range interface 534 is configured to communicate using one or more short range wireless protocols such as, for example, near field communications (NFC), Bluetooth®, Bluetooth LE, etc. In an embodiment, a mobile interface 540 is configured to communicate utilizing a cellular or other mobile protocol. A Global Positioning System (GPS) interface 538 may be in communication with one or more earth-orbiting satellites or other suitable position-determining systems to identify a position of the architecture 500. In an embodiment, a wired communication module 542 is configured to communicate according to the USB protocol or any other suitable protocol.

The architecture 500 may also include one or more sensors 530 such as, for example, one or more position sensors, image sensors, and/or motion sensors. A microphone 570 is shown in FIG. 5, by way of example.

As noted above, multiple devices may be employed in a single system. In such a multi-device system, each of the devices may include different components for performing different aspects of the system's processing. The multiple devices may include overlapping components. The components of the rank product systems, as described herein, are exemplary, and may be located as a stand-alone device or may be included, in whole or in part, as a component of a larger device or system.

Figure 6:
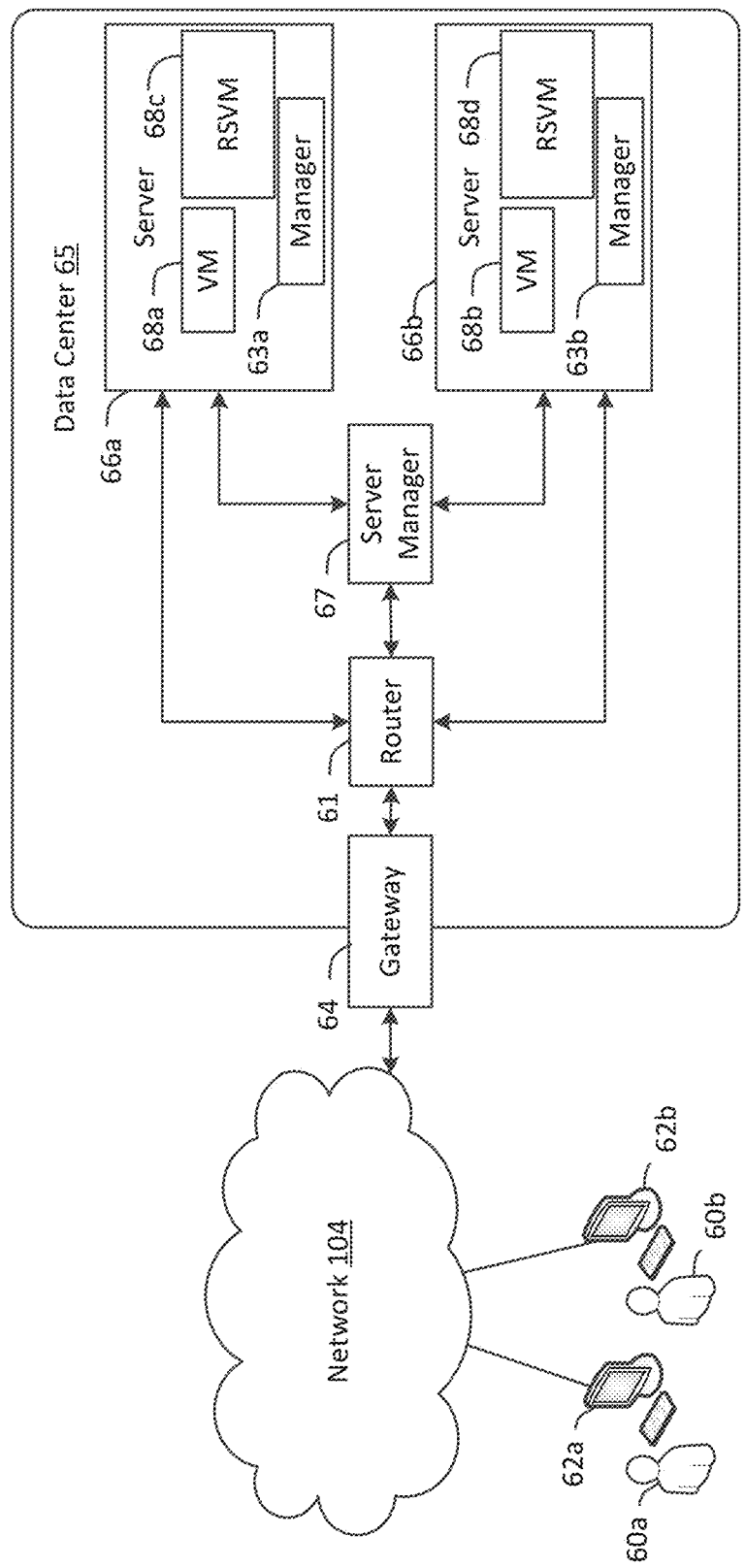
FIG. 6 is a diagram illustrating an example system for sending and providing data that may be used in accordance with the present disclosure.

An example system for sending and providing data and performing various computer processing techniques will now be described in detail. In particular, FIG. 6 illustrates an example computing environment in which the embodiments described herein may be implemented. For example, the computing environment of FIG. 6 may be used to provide ranking of search results as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the rank product techniques described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and enabling computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems, systems that support various interpreted or compiled programming languages such as Ruby, Perl, Python, C, C++ and the like or high-performance computing systems) suitable for the applications, without, for example, requiring the client to access an instance or an execution platform directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   receiving, by a search engine, a query;
   generating, by the search engine based on the query, a first ranked list of content items ranked based on a first optimization objective;
   generating, based on the query, a second ranked list of the content items ranked based on a second optimization objective;
   determining, for a first content item, a first multi-objective ranking by adding or multiplying a rank of the first content item in the first ranked list with a rank of the first content item in the second ranked list, wherein the rank of the first content item in the first ranked list is a first ordinal rank representing a first position of the first content item in the first ranked list relative to other items in the first ranked list determined based on the first optimization objective, and wherein the rank of the first content item in the second ranked list is a second ordinal rank representing a position of the first content item in the second ranked list relative to other items in the second ranked list determined based on the second optimization objective;
   generating a third ranked list of the content items using the first multi-objective ranking; and
   causing at least a portion of the third ranked list of the content items to be displayed on a display.

2. The method of claim 1, further comprising:
   determining a set of features used by a learning to rank (LTR) algorithm used to generate the first ranked list of content items;
   determining a subset of features from the set of features using a relevance metric; and
   generating the third ranked list using the subset of features.

3. The method of claim 1, further comprising:
   determining, for the first content item, a first feature value related to the first optimization objective;
   determining, for a second content item, a second feature value related to the first optimization objective; and generating the first ranked list based at least in part on a comparison of the first feature value to the second feature value.

4. The method of claim 1, further comprising:
determining, for a second content item, a second multi-objective ranking based at least in part on multiplication of a rank of the second content item in the first ranked list with a rank of the second content item in the second ranked list;
determining that the first multi-objective ranking is less than the second multi-objective ranking; and
ranking the first content item higher in the third ranked list of the content items relative to a rank of the second content item in the third ranked list based at least in part on the first multi-objective ranking being less than the second multi-objective ranking.

5. The method of claim 1, wherein features associated with the first optimization objective and the second optimization objective are ordinal.

6. The method of claim 1, further comprising:
determining the first ranked list of content items using a first machine learning model, wherein the first machine learning model is trained using at least one feature related to the first optimization objective; and
determining the second ranked list of the content items using a second machine learning model, wherein the second machine learning model is trained using at least one feature related to the second optimization objective.

7. The method of claim 1, further comprising:
determining, for each content item of the first ranked list of content items a respective feature value for a first feature; and
generating the first ranked list by ranking each content item in descending order of the respective feature values, wherein a second content item associated with a highest feature value is a top-ranked content item in the first ranked list of content items.

8. The method of claim 1, further comprising generating, for the first optimization objective, an aggregated feature, wherein the aggregated feature is generated by determining a product of a plurality of feature values, wherein each feature value of the plurality of feature values is associated with a different feature.

9. The method of claim 8, further comprising:
receiving a second query;
retrieving, from a first non-transitory computer-readable memory, the aggregated feature; and
generating a fourth ranked list of the content items based at least in part on inputting the aggregated feature into a machine learning model.

10. A system comprising:
at least one processor; and
at least one non-transitory computer-readable memory storing instructions that, when executed by the at least one processor, is effective to:
receive a query;
generate, by a search engine based on the query, a first ranked list of content items ranked based on a first optimization objective;
generate, based on the query, a second ranked list of the content items based on a second optimization objective;
determine, for a first content item, a first multi-objective ranking by adding or multiplying a rank of the first content item in the first ranked list with a rank of the first content item in the second ranked list, wherein the rank of the first content item in the first ranked list is a first ordinal rank representing a first position of the first content item in the first ranked list relative to other items in the first ranked list determined based on the first optimization objective, and wherein the rank of the first content item in the second ranked list is a second ordinal rank representing a position of the first content item in the second ranked list relative to other items in the second ranked list determined based on the second optimization objective;
generate a third ranked list of the content items using the first multi-objective ranking; and
cause the third ranked list of the content items to be displayed on a display.

11. The system of claim 10, the at least one non-transitory computer-readable memory storing further instructions that, when executed by the at least one processor, are further effective to:
determine a set of features used by a learning to rank (LTR) algorithm, the set of features used to generate the first ranked list of content items;
determine a subset of features from the set of features using a relevance metric; and
generate the third ranked list using the subset of features.

12. The system of claim 10, the at least one non-transitory computer-readable memory storing further instructions that, when executed by the at least one processor, are further effective to:
determine, for the first content item, a first feature value related to the first optimization objective;
determine, for a second content item, a second feature value related to the first optimization objective; and
generate the first ranked list based at least in part on a comparison of the first feature value to the second feature value.

13. The system of claim 10, the at least one non-transitory computer-readable memory storing further instructions that, when executed by the at least one processor, are further effective to:
determine, for a second content item, a second multi-objective ranking based at least in part on multiplication of a rank of the second content item in the first ranked list with a rank of the second content item in the second ranked list;
determine that the first multi-objective ranking is less than the second multi-objective ranking; and
rank the first content item higher in the third ranked list of the content items relative to a rank of the second content item in the third ranked list based at least in part on the first multi-objective ranking being less than the second multi-objective ranking.

14. The system of claim 10, wherein features associated with the first optimization objective and the second optimization objective are ordinal.

15. The system of claim 10, the at least one non-transitory computer-readable memory storing further instructions that, when executed by the at least one processor, are further effective to:
determine the first ranked list of content items using a first machine learning model, wherein the first machine learning model is trained using at least one feature related to the first optimization objective; and
determine the second ranked list of the content items using a second machine learning model, wherein the second machine learning model is trained using at least one feature related to the second optimization objective.

16. The system of claim 10, the at least one non-transitory computer-readable memory storing further instructions that, when executed by the at least one processor, are further effective to:
   determine, for each content item of the first ranked list of content items a respective feature value for a first feature; and
   generate the first ranked list by ranking each content item in descending order of the respective feature values, wherein a second content item associated with a highest feature value is a top-ranked content item in the first ranked list of content items.

17. The system of claim 10, the at least one non-transitory computer-readable memory storing further instructions that, when executed by the at least one processor, are further effective to:
   generate, for the first optimization objective, an aggregated feature, wherein the aggregated feature is generated by determining a product of a plurality of feature values, wherein each feature value of the plurality of feature values is associated with a different feature.

18. A method comprising:
   receiving, by an online search engine, a query;
   generating, by the online search engine based on the query, a first ranked list of content items ranked based on a first optimization objective;
   generating, based on the query, a second ranked list of the content items ranked based on a second optimization objective;
   determining, for a first content item, a first multi-objective ranking by multiplying a rank of the first content item in the first ranked list with a rank of the first content item in the second ranked list, wherein the rank of the first content item in the first ranked list is a first ordinal rank representing a first position of the first content item in the first ranked list relative to other items in the first ranked list determined based on the first optimization objective, and wherein the rank of the first content item in the second ranked list is a second ordinal rank representing a position of the first content item in the second ranked list relative to other items in the second ranked list determined based on the second optimization objective;
   generating a third ranked list of the content items using the first multi-objective ranking; and
   causing at least a portion of the third ranked list of the content items to be displayed on a display.

19. The method of claim 18, further comprising:
   determining a set of features used by a learning to rank (LTR) algorithm used to generate the first ranked list of content items;
   determining a subset of features from the set of features using a relevance metric; and
   generating the third ranked list using the subset of features.

20. The method of claim 18, further comprising:
   determining, for the first content item, a first feature value related to the first optimization objective;
   determining, for a second content item, a second feature value related to the first optimization objective; and
   generating the first ranked list based at least in part on a comparison of the first feature value to the second feature value.

* * * * *